3,070,600
SURFACTANT HYDRAZINIUM SALTS
Bernard Rudner, Pittsburgh, Pa., assignor to W. R.
Grace & Co., New York, N.Y., a corporation of Connecticut
No Drawing. Filed Feb. 8, 1960, Ser. No. 7,084
11 Claims. (Cl. 260—247.2)

This invention relates to nitrogenous quaternary salts. In one specific aspect, it relates to a new generic class of nitrogenous salts derived from quaternized hydrazines. In another aspect it relates to a new group of organic surfactant salts having both anionic and cationic activity.

It has recently been discovered that chloramine will react with tertiary amines under a wide range of conditions to produce hydrazinium chlorides. I have now discovered that the replacement of the chloride anion with an organic anion of the proper structure yields novel salts showing unobvious and unexpected improvement in their surfacant, lubricative and anti-static properties. This application is a continuation-in-part of my co-pending application Serial Number 619,691, filed November 1, 1956, now abandoned.

It is therefore an object of the present invention to provide a new and useful generic class of hydrazinium salts which demonstrate outstanding surface activity and which are useful as anti-static additives in petroleum products.

In accordance with the present invention, I have provided a new generic class of hydrazinum salts having the general formula:

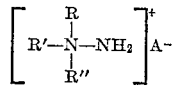

In the above formula, the substituents which may be attached to the quaternized nitrogen atom and indicated by the letters R, R' and R" are these. R is selected from the group consisting of aliphatic hydrocarbon radicals having 8 to 24 carbon atoms, median alkoxy lower alkyl, median alkylamino lower alkyl, median acyclic acyloxy lower alkyl, median acylic acylamino lower alkyl and median acyclic acyloxy lower alkylamino lower alkyl. R' is selected from the group consisting of aliphatic hydrocarbon radicals having less than 25 carbon atoms, hydroxy lower alkyl, hydroxy polyloweralkoxy lower alkyl, median aliphatic acyloxy lower alkyl and median aliphatic acylamino lower alkyl when taken alone. R" is selected from the group consisting of aliphatic hydrocarbon radicals having less than 25 carbon atoms, amino lower alkyl, hydroxy lower alkyl, hydroxy polyloweralkoxy lower alkyl and median aliphatic acyloxy lower alkyl when taken alone. When R' and R" are taken together with the N to which they are attached, they may form a non-aromatic ring selected from the group consisting of imidazoline, morpholine, piperidine and pyrrolidine. The anion A is selected from the following: alkyl carboxylates having from 8 to 24 carbon atoms, alkenyl carboxylates having from 8 to 24 carbon atoms, cycloalkyl, cycloalkylalkyl and alkylcycloalkyl carboxylates containing below 40 carbon atoms, hydroxyalkyl carboxylates, alkanoylaminoalkyl carboxylates, alkenoylaminoalkyl carboxylates, haloalkyl carboxylates, alkylsulfonates having from 10 to 24 carbon atoms, carboxyalkylsulfonates, dicarboalkoxyalkylsulfonates, alkanoylaminoloweralkylsulfonates, alkenoylaminosulfonates, alkanoyloxyalkylsulfonates, alkenyloxyalkylsulfonates, alkarylsulfonates and poly(alkaryl)sulfonates.

In preparing my novel compounds, the hydrazinium chloride is usually the starting material employed. The chloride can be prepared by one of several procedures.

One method comprises the introduction of a gaseous chloramine stream into an aqueous or anhydrous solution of the proper tertiary amine. If the amine is liquid, it can function as its own solvent. The hydrazinium chloride thus formed is isolated by standard chemical procedures. Alternatively, the chloride can be obtained by the reaction of chlorine and a tertiary amine in the presence of excess ammonia.

The novel salts of the instant invention are preferably prepared by the metathetical reaction between the hydrazinium chloride and an alkali metal organic salt of the desired anion. In short, the method comprises mixing e.g. aqueous solutions of the reactant salts with heat if necessary—or mixing organic solutions of the two components. As an alternative procedure two dry components can be melted together to form my novel compounds. The desired hydrazinium salt is then isolated and purified using standard techniques more fully described in the specific examples that follow. It is often unnecessary in specific instances, and therefore undesirable in those instances, to isolate the hydrazinium chloride before conversion to the new and useful salts of the present invention.

It is also obvious that hydrazinium salts other than chloride may be used as starting materials to supply the desired cation. Variation is equally possible with respect to the compounds supplying the desired anion of my novel salts. It is elementary, for example, that the reaction of a hydrazinium sulfate with e.g. sodium oleate, will give the same organic product as does the reaction of the corresponding hydrazinium bromide with calcium oleate. Another alternative route to the same hydrazinium oleate would be by neutralizing the corresponding hydrazinium hydroxide with oleic acid, viz:

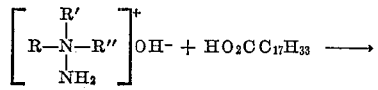

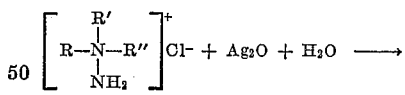

This route usually offers no advantage over those described before since the hydrazinium hydroxide must be first prepared, usually from the corresponding chloride, by the action of silver oxide.

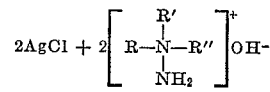

Available reagents are only limited to those compounds capable of supplying the desired anions and cations which make up my novel salts.

I have indicated that it is convenient to effect the change of anion in aqueous solution, since hydrazinium salts are usually soluble in such solutions. Obviously, this is a preferred mode of operation, not a limitation, since the use of certain unreactive organic solvents would be equally effective for my purposes. The term "unreactive" as applied to the solvent is intended to embrace those solvents that do not react preferentially with the cation or anion-supplying compound. Such solvents include: alcohols such as methyl, ethyl, isopropyl and ethoxyethyl; amides such as formamide, dimethylformamide; esters such as ethyl acetate; ketones such as acetone; halogenated hydrocarbons such as chloroform and chlorobenzene; hydrocarbons such as heptane, benzene, xylene, cyclohexane, tetralin; ethers such as dioxane, ethylether, carbitol, and tetrahydropyran; nitrohydrocarbons such as 2-nitropropane and nitrobenzene; and other functionally equivalent materials.

The appearances and physical properties of my novel salts vary appreciably, even in a series of one particular anion or cation. Where solid products are formed, they tend to be low melting and waxy. They are usually appreciably more soluble in a solution containing one of the reactants than in water alone. Hydrazinimum salts of fatty acids are much more readily hydrolyzed by alkali or acid than the corresponding salts of the detergent sulfonates or phosphates. In alkaline solution, this hydrolysis will often occur without obvious physical changes, since the hydrazinium hydroxide and the soap thus formed may have about the same co-solubilities in the mixture as the unhydrolyzed salt. Acid hydrolysis of an acid solution however, will yield the water-insoluble fatty acid.

My invention is illustrated but not delimited by the following specific examples in which the terms Armeen, Empol, Ethoduomeen, Nekal, Leonil, Petowet, Santomerse, Tamol, Ethomeen, Quadro, and Igepon are trademarks:

*Example I*

A mixture of 5 g. of Castile soap and 2 g. of the hydrazinium chloride prepared from "Armeen M2HT," a commercially available mixture of dihexadecylmethylamine and dioctadecylmethylamine, was fused by gentle heating.

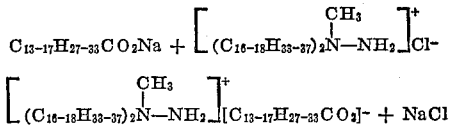

After the fusion the mixture was stirred at a minimum melting temperature for about fifteen minutes. It was extracted cold with dry acetone. The resulting tan solution, 300 ml., was evaporated to dryness to give a crude paste, weighing 2.1 g. The paste was washed successively with hexane, alcohol, and water; it was thereafter twice extracted with acetone, and evaporated to dryness. The substance thus obtained was vacuum dried at 28° C. and 3 mm. to a constant weight (44 hours) to give a very soft brown paste melting slightly above room temperature. This novel product was the mixed olive oil fatty acid salts of the methyl dihydrotallowhydrazinium cation. "Castile soap" is an accepted name for the purified product obtained from careful saponification of olive oil. As such, it is a mixture of sodium salts of approximately 1% laurate, 9% myristate, 2% palmitate, 81% oleate and 7% linoleate. The Armeen M2HT used to prepare the hydrazinium chloride is claimed by its manufacturers to be a mixture containing approximately 90% tertiary amine, of which approximately 70% is methyldioctadecylamine, 23% methyldihexadecylamine, 5% is trioctadecylamine and 2% trishexadecylamine. Because of the highly unsaturated nature of the anion, one would not expect the hydrazinium salt to be stable. Although it does slowly develop a crust, it is appreciably more stable to fluorescent light and air than is the fatty acid salt obtained by reacting olive oil fatty acids with "Armeen M2HT," i.e., the fatty acid salt of the parent amine.

*Example II*

A clear aqueous solution of a polymerized sodium oleate was prepared by mixing 5 g. of polymerized oleic acid and 30 ml. of alcohol. To this mixture was added 2 g. of NaOH as a 40% aqueous solution. The reaction mixture was shaken well to form a sludge of sodium salts; sufficient water was thereafter added to give a clear 5% solution. The polymerized oleic acid used was available commercially as "Empol 1022 Polymerized Fatty Acid." It was a mixture of approximately 80% dimerized oleic acid, 17% trimerized oleic acid and a 3% monomer with a neutralization equivalent of approximately 300.

The most commonly accepted structure for the dimer acid, as given by the manufacturer, is:

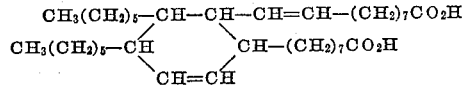

*Example III*

The dimerate of Example II was added as a 0.001 mole solution to 2 equivalents of 1,1-dimethyl-1-[β(p-octylphenoxyethoxy)ethyl] hydrazinium chloride in a saturated aqueous solution. The reaction mixture became turbid and did not change substantially in 48 hours. Addition of sodium chloride in 10 weight percent of the volume of solution gave an upper layer of a gel. The gel was separated, purified by chloroform extraction and dried to give 0.41 g. of tan paste. This paste was insoluble in water and alcohol, soluble in chloroform and formed highly viscous solutions at low concentrations in aromatic hydrocarbons. Since the commonly accepted structure for "Dimer Acid" is that shown in Example II, our novel product has the probable structure:

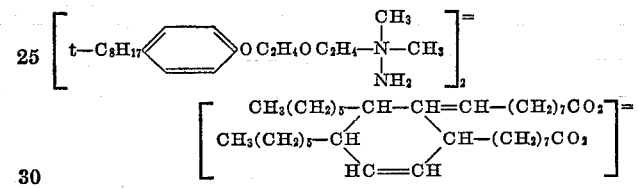

*Example IV*

An emulsion prepared from 5 g. of coconut oil fatty acids, 5 g. of technical grade dimethyloctadecylamine (available commercially as "Armeen DM–18") and 200 ml. concentrated ammonium hydroxide was treated simultaneously with gaseous chlorine and ammonia at room temperature until 4 equivalents of chlorine and 20 of ammonia had been added. The emulsion was stirred overnight at room temperature; after this interval no active chlorine was detected therein. The floating sludge, which formed slowly after stirring had been stopped, was separated by siphoning off of the bottom layer. It was dried, washed with hexane, then purified by solution in chloroform and precipitated with excess hexane. The soft gray wax thus obtained melted indefinitely at 48–53° C., then decomposed with evolution of gas at about 150° C.

The coconut oil fatty acids, prepared commercially by hydrolysis of coconut oil, are a mixture of approximately 0.5% caproic, 8% caprylic, 7% capric, 48% lauric, 17% myristic, 9% palmitic, 2% stearic, 0.2% palmitoleic, 6% oleic and 2% linoleic. The fatty amine, according to its manufacturer, is a mixture containing approximately 85% tertiary amine, in turn a mixture of about 95% $C_{18}$ and 5% $C_{16}$ compounds. Our novel product is therefore a mixture of hydrazinium salts, the preparation of the predominant dimethyloctadecylhydrazinium chloride being shown.

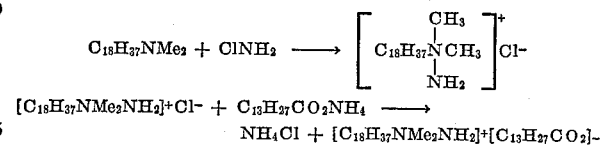

*Example V*

Aminotallowmorpholinium chloride is prepared from "Tallowmorpholine" according to U.S. Patent 2,848,450. The parent amine according to its manufacturers, is prepared by the action of bis-2-chloroethylether on "Tallowamine" and is therefore a mixture of 4-alkylmorpholines in which the alkyl is approximately 1% tetradecyl, 28% hexadecyl, 25% octadecyl and 46% octadecenyl. The hydrazinium salt was added in aqueous solution to an aqueous sodium stearate suspension:

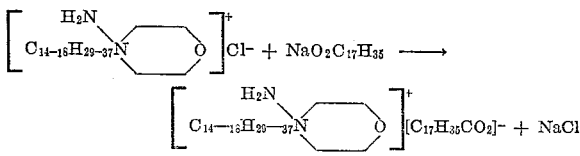

The solution was evaporated to dryness and the product thus obtained was a tan paste, clearly water soluble, with foaming properties. Extraction with chloroform freed it of sodium chloride, and a hexane wash freed it of oils.

*Example VI*

Stearoylaminopropyldimethylhydrazinium chloride was fused with free stearic acid flakes in a 1.5:1 weight ratio.

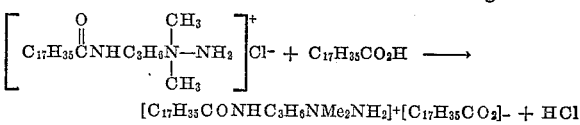

$[C_{17}H_{35}CONHC_3H_6NMe_2NH_2]^+[C_{17}H_{35}CO_2]^- + HCl$

It was worked up by a technique similar to that described in Example I to give a 71% yield of thick yellow oil, which was water-dispersible. This oil showed excellent properties as an emulsificant.

*Example VII*

An aqueous emulsion from 15 g. 2-p-octylphenoxyethoxyethyldimethylamine, in 150 ml. 10% $NH_4OH$, was chloraminated by the addition of chlorine. The aqueous solution, freed of unreacted amine, was boiled with 0.75 equivalents (assuming 46% yield) of sodium abietate as a 1% aqueous solution for ten minutes. The mixture was chilled, filtered, washed with hexane, dried, and extracted with $CHCl_3$ to give 8 g. of gummy brown product. This novel salt darkens somewhat in air and light, melts clear and decomposes with darkening at about 120–132° C.

*Example VIII*

An aqueous suspension of 1 g. 1-amino-1-β-hydroxyethyl-2-heptadecenyl-2-imidazolinium chloride was prepared from the commercial waxy mixture, "Amine O" described by its manufacturer as chiefly 1-p-hydroxyethyl-1-2-heptadecenyl-2-imidazoline of molecule weight 255. A solution of sodium oleate was added thereto to form an aqueous suspension. Addition of a 10 weight percent of the volume of the solution of sodium chloride gave an upper layer of gel which after being separated and purified by chloroform extraction and dried gave 1.3 g. of a whitish soapy semi-solid which was dispersible in cold water.

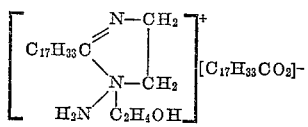

*Example IX*

An aqueous solution of tallowmorpholinium chloride as described in Example V was added to an aqueous solution of sodium oleate. The product obtained from this reaction mixture was a yellow paste that was water-dispersible with a marked gelling action.

*Example X*

The hydrazinium salt of dimethylsoyamine was derived from a commercial product known as "Armeen DMS." DMS is described by its manufacturer as being the reaction product of formaldehyde, formic acid, and "soyamine." The parent amine, obtained from soybean oil, is a mixture containing hexadecylamine, octadecylamine, octadecenylamine and octadecadienylamine in approximately a 20:17:26:37 ratio. The hydrazinium salt was added in aqueous solution to the "Dimer Acid" described in Example II. Evaporation to dryness gave 1.8 g. (83% of theory) of a pale yellow product which was dispersible in hot water. After drying the product oxidized to a brownish gum.

*Example XI*

An aqueous solution of methyldihydrotallowhydrazinium chloride prepared from the commercial product "Armeen M2HT," was added to an aqueous solution containing mixed palm oil fatty acid potassium salts. The mixed aqueous solutions were refluxed and the product isolated after evaporation of the water. Since palm oil is a mixture of glycerides of myristic, palmitic, stearic, oleic, linoleic and lignoceric acids, the final product was the mixture as shown.

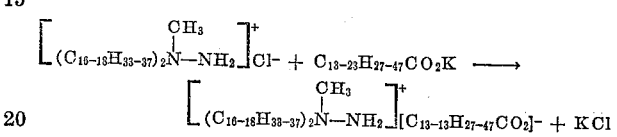

This product, 68% pure, representing 82% of theoretical yield, was a soft off-white paste softening at about 35° C. and decomposing above 100° C.

*Example XII*

The procedure of Example X was substantially repeated using the hydrazinium acetate of tallowaminopropyl-bis-(hydroxyethyl)amine, available commercially as "Ethoduomeen T-12." This base is described by its manufacturer as having the formula $RNHC_3H_6N(C_2H_4OH_2)$, in which R is a mixture of hexadecyl and octadecyl in a 30:70 ratio. It is prepared by reacting tallowamine with acrylonitrile, reducing both the nitrile and the double bonds, and reacting the saturated diamine thus formed with 2 equivalents of ethylene oxide. The yield of vacuum-dried product, which decomposed at about 186° C., was 2.3 g.; approximately 83% of theory. It was a buff colored paste, slightly dispersible in cold water and readily dispersible in hot water. It was a rapid emulsifier and a fair gelling agent.

*Example XIII*

An aqueous solution of the hydrazinium salt of Example VIII, 1-amino-1-β-hydroxyethyl-2-heptadecenyl-2-imidazolinium chloride, was mixed with an aqueous solution of dialkylnaphthalenesulfonate available commercially as "Nekal." The mixed aqueous solutions were allowed to sit overnight. The product obtained therefrom was a very soft, light yellow gel which was readily dispersible in hot water. It had excellent emulsifying properties. On the basis of a formula weight corresponding to

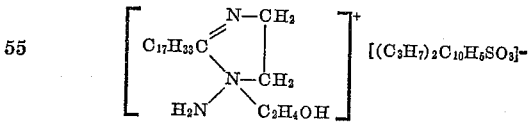

the yield was 56% of theory.

*Example XIV*

The detergent acid of Example XIII was mixed in aqueous solution with the hydrazinium chloride of Example II, 1-dimethyl-1-(p-octylphenoxyethoxy)ethyl hydrazinium chloride. The resulting product was a cream colored, water-insoluble, waxy paste, which was not solidified by vacuum-drying.

*Example XV*

The detergent acid of Example XIII was mixed in aqueous solution with 1-amino-1-(2-hydroxyethyl)morpholinium chloride, resulting in a slow precipitation. The product obtained from this mixture was a white, cold water-dispersible oil. It was an excellent dispersant.

Example XVI

The detergent acid of Example XIII was mixed in aqueous solution with 1,1-bis(hydroxyhexasesquioxyethyl)soyhydrazinium chloride. This mixture gave as a product a clearly cold water soluble oil, largely

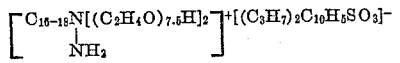

Example XVII

The detergent acid of Example XIII was mixed in aqueous solution with 1,1-dioctadecyl-1-methylhydrazinium chloride. The product obtained from this mixture was a low melting, waxy solid. It was insoluble in cold water and dispersible in hot.

Example XVIII

An aqueous solution of the di-butylnaphthalenesulfonate acid, known commercially as "Leonil" (similar to the detergent of Example XIII) was added to an aqueous solution containing 4.8 g. methyldihydrotallowhydrazinium chloride. From this mixture was obtained a white solid, weight 5.1 g. crude melting clear at 105–111° C., with decomposition above 200° C. This product, largely

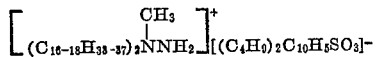

was insoluble in water and ethyl alcohol, but soluble in chloroform. It had poor emulsifying properties but responded well as a dispersing agent.

Example XIX

An aqueous solution of the sodium salt of an alkyl sulfonic acid having the approximate formula:

$$C_{12-18}H_{23-37}SO_3H$$

known commercially as "Petrowet" was added to an aqueous solution of the hydrazinium salt of Example XII. The product resulting from this reaction mixture was a tan semi-solid, decomposing at about 140° C., representing a yield of 47% of theory. It was water-insoluble in methyl alcohol and chloroform. It had excellent emulsifying properties.

Example XX

The sodium salt of alkylbenzenesulfonic acid having the approximate formula: p-$C_{8-12}H_{17-25}C_6H_4SO_3H$ known commercially as "Santomerse" was mixed in aqueous solution with methyldihydrotallowhydrazinium chloride. Products such as "Santomerse" are frequently made by alkylating (e.g. by the Friedel-Crafts reaction) benzene with propylene trimer-tetramer mixture, or a butylene dimer-trimer mixture, then sulfonating with $H_2SO_4$ or $SO_3$ or combinations. Using the work-up procedure similar to that of Example XVIII, a white solid melting clear at 105–111° C. and decomposing above 200° C. was obtained. Like the product of Example XVIII this novel salt was insoluble in water and ethyl alcohol and soluble in chloroform. It had poor emulsifying properties, but good dispersing properties.

Example XXI

Sulfonated polynaphthalenepolymethylene known commercially as "Tamol" having the approximate structural formula:

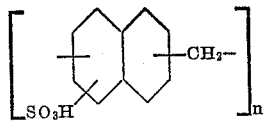

was mixed dry with bis(hydroxypolyethoxyethyl)soyamine chloramine adducts.

is known commercially as "Ethomeen S/60." The product thus obtained was a brown oil which was difficult to purify. It was readily water dispersible. Tamol and related products are made by condensing naphthalene and formaldehyde, then sulfonating the low molecular weight polymer thus obtained.

Example XXII

The detergent acid of Example XXI was added in aqueous solution to the chloramine adduct of 2-stearoyloxypropyltris-(2-hydroxypropylethylenediamine) having the approximate formula:

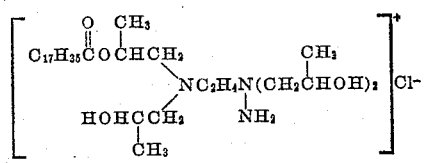

The parent compound of this hydrazinium salt is available commercially as "Quadrol Monostearate." The product obtained from the metathesis reaction was a brown oily gum decomposing about 106° C. It was water-insoluble but chloroform soluble. It had the properties of an excellent dispersing agent.

Example XXIII

N-methyl-N-"tallowyl"-taurine having the structural formula:

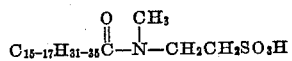

available commercially as "Igepon TE–42," was added in aqueous solution to dimethyloctadecylhydrazinium chloride, the chloramine adduct of the commercial amine "Armeen DM–18." The product

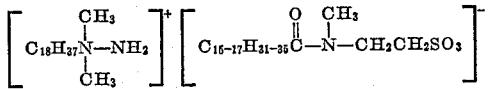

was a brown wax weighing about 1.6 g. (59.3% yield) which was readily dispersible in hot water.

My novel products show remarkable utility in many fields. It is already apparent from the specific examples that these new salts are excellent dispersing and emulsifying agents. Specific applications for such purposes are governed largely by the structure of the hydrazinium moiety. For example, the salt of a dispersing acid and a water-soluble hydrazinium chloride in itself useful as an oil and water emulsifier, e.g. the chloramine adduct of "Ethomeen S/60," shows a synergistic benefit in its utility both for suspending oil soluble solids and dispersing oils in water. Just as the surfactant hydrazinium chlorides are potent biocides, so are the novel salts of the detergent acids. The latter have the additional advantage of being oil soluble or oil dispersible. This makes them particularly useful in sterilizing oils for organic solutions and, industrially, in combatting decay due to molds, yeast or bacteria in organic media, e.g. in petroleum reservoirs and wells. The increased solubility due to presence of an organic cation lends value herein.

While the novel hydrazinium salts of detergent acids are of obvious value by themselves, they show even improved utility in mixtures containing one of their component reactants in excess. Thus, milling a surfactant hydrazinium compound into a soap bar, using for example the chloramine adduct of tallow-morpholine in weights up to about 8 percent of the detergent ingredient, gives an effective anti-microbial soap containing the mixed soap fatty acid salts of the 4-amino-4-tallowmorpholinium cation. In addition to this highly desirable antiseptic action—which soap alone does not have—the salt thus obtained possesses by virtue of its hydrazinium residue a marked anti-oxidant and discolor resistant action. Commercial soaps now contain expensive antioxidants; a few contain bacteriastatic or fungistatic agents. Our additive, a single compound giving both effects, is more permanent in the soap because it is chemically combined therewith. These compounds are also useful as toothpaste additives where their anti-bacterial and foaming action come to the fore.

As stated previously, the long chains present in both the cation and anion portions of my novel compounds increase their solubility in non-polar system. Hence, my compounds are useful as petroleum additives where the presence of the hydrazinium group acts as an anti-oxidant and at the same time is sufficiently polar to act as an anti-static agent. This property is especially desirable in additives to gasoline products where the presence of dissolved polar functions prevents the formation of highly dangerous static charges in the liquid as it is pumped through pipes and hoses. This is especially important in the loading and unloading of large storage tanks and petroleum tankers.

Having described my invention, I claim:

1. Compounds having the formula:

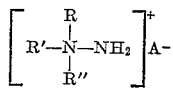

wherein R is a member selected from the group consisting of aliphatic hydrocarbon radicals having 8 to 24 carbon atoms, alkoxy lower alkyl, alkylamino lower alkyl, acyclic acyloxy lower alkyl, acyclic acylamino lower alkyl and acyclic acyloxy lower alkylamino lower alkyl, R' is a member selected from the group consisting of aliphatic hydrocarbon radicals having less than 25 carbon atoms, hydroxy lower alkyl, hydroxy polyloweralkoxy lower alkyl, aliphatic acyloxy lower alkyl and aliphatic acylamino lower alkyl when taken alone, R" is a member selected from the group consisting of aliphatic hydrocarbon radicals having less than 25 carbon atoms, amino lower alkyl, hydroxy lower alkyl, hydroxy polyloweralkoxy lower alkyl and aliphatic acyloxy lower alkyl when taken alone, R' and R" taken together with the N to which they are both attached form a non-aromatic ring selected from the group consisting of imidazoline, morpholine, piperidine and pyrrolidine, and A is a member selected from the group of anions consisting of anions of alkyl carboxylates having from 8 to 24 carbon atoms, alkenyl carboxylates having from 8 to 24 carbon atoms, cycloalkyl, cycloalkylalkyl and alkylcycloalkyl carboxylates containing less than 40 carbon atoms, hydroxyalkyl carboxylates, alkanoylaminoalkyl carboxylates, alkenoylaminoalkyl carboxylates, haloalkyl carboxylates, alkylsulfonates having from 10 to 24 carbon atoms, carboxyalkylsulfonates, dicarboalkoxyalkylsulfonates, alkanoylaminoloweralkylsulfonates, alkenoylaminosulfonates, alkanoyloxyalkylsulfonates, alkenyloxyalkylsulfonates, alkarylsulfonates and poly(alkaryl)sulfonates.

2. Compounds according to claim 1 wherein R is an aliphatic hydrocarbon radical having 8 to 24 carbon atoms, R' and R" are aliphatic hydrocarbon radicals having less than 25 carbon atoms and A is the coco fatty acid anion.

3. Compounds according to claim 1 wherein R is alkylamino lower alkyl, R' and R" are hydroxy lower alkyl and A is a an alkylcycloalkyl carboxylate.

4. Compounds according to claim 1 wherein R is an aliphatic hydrocarbon radical having 8 to 24 carbon atoms, R' and R" are hydroxypolyloweralkoxy lower alkyl and A is alkarylsulfonate.

5. Compounds according to claim 1 wherein R is an aliphatic hydrocarbon radical having 8 to 24 carbon atoms, R' and R" taken together with the N to which they are both attached form a morpholine ring and A is an alkyl carboxylate having from 8 to 24 carbon atoms.

6. Compounds according to claim 1 wherein R is acylic acylamino lower alkyl, R' and R" are aliphatic hydrocarbon radicals having less than 25 carbon atoms and A is an alkyl carboxylate having from 8 to 24 carbon atoms.

7. The coco oil fatty acid salt of the 1,1-dimethyl-1-octadecylhydrazinium cation.

8. The dimerized oleic acid salt of the 1,1-bis-(2-hydroxyethyl) - 1 - [3-hydrotallowamino)propyl]hydrazinium cation.

9. The dialkylnaphthalenesulfonic acid salt of the 1-soy-1,1-bis-(hydroxypolyethoxyethyl)hydrazinium cation.

10. The stearate salt of the 4-amino-4-tallowmorpholinium cation.

11. The stearate salt of the 1,1-dimethyl-1-(3-stearoylamino)propylhydrazinium cation.

References Cited in the file of this patent
UNITED STATES PATENTS 2,955,108    Omietanski _____ Oct. 4, 1960

OTHER REFERENCES

Westphal: Berichte, vol. 74, pages 759–776 (1941).
Westphal: Berichte, vol. 74, pages 1365–1372 (1941).
Schwartz et al.: Surface Active Agents, 1949, pages 1 to 20.
Weitz: Angewandte Chemie, vol. 66, July–December 1954, pages 658–677.